United States Patent
Keller et al.

(10) Patent No.: US 6,204,871 B1
(45) Date of Patent: Mar. 20, 2001

(54) RECORDING DRUM ARRANGEMENT

(75) Inventors: Guido Keller, Adlikon; Markus Landolt, Zürich, both of (CH)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/456,435

(22) Filed: Dec. 8, 1999

(30) Foreign Application Priority Data

Dec. 8, 1998 (EP) ................................................. 98123045

(51) Int. Cl.⁷ ............................. G03G 15/00; H04N 1/00
(52) U.S. Cl. ......................... 347/139; 347/262; 355/72; 358/302
(58) Field of Search ............................... 347/139, 153, 347/157, 264, 104; 346/134, 136, 138; 399/161; 355/72, 73; 358/302, 304

(56) References Cited

U.S. PATENT DOCUMENTS

| 3,829,208 | * | 8/1974 | Van Meijel | 399/161 |
| 4,707,712 | * | 11/1987 | Buckley et al. | 346/136 |
| 5,159,352 | | 10/1992 | Ferla et al. | |
| 5,548,408 | | 8/1996 | Koren. | |

FOREIGN PATENT DOCUMENTS

| 59-59448 | | 4/1984 | (JP). |
| 63-315270 | * | 12/1988 | (JP). |
| 2-120762 | | 5/1990 | (JP). |

* cited by examiner

*Primary Examiner*—Joan Pendegrass
(74) *Attorney, Agent, or Firm*—Burns, Doane, Swecker & Mathis, LLP

(57) ABSTRACT

An image-recording drum apparatus includes a rotatably driven clamping drum (100), means (160) for the fastening of a recording medium (M) on the mantle (110) of the clamping drum and a recording unit (200) which is stationary relative to the direction of rotation of the clamping drum and records on the recording medium (M) fastened onto the mantle of the rotating clamping drum (100) image information fed thereto in the form of electrical signals. Mounting means (120) are provided in the interior of the clamping drum (100) for supporting a supply of recording medium (M) wound up into a roll (130). The clamping drum (100) has a slit (140) in its mantle (110) through which the recording medium (M) can be guided from the interior of the clamping drum (100) to its mantle (110) and fastened thereon. The feeding of the recording medium from the interior of the clamping drum is on the one hand constructively especially simple and advantageous and on the other hand permits the cutting of the recording medium only after the recording of the image information to the respectively required exact length without generating clippings. The picture format can thereby be arbitrarily varied within the available length of the clamping drum circumference which permits a very flexible and economical operation of the recording apparatus (FIG. 1).

14 Claims, 12 Drawing Sheets

RECORDING DRUM ARRANGEMENT

FIELD OF THE INVENTION

The invention relates to a device for the recording of image information on a planar recording medium. In particular, the invention relates to a device for the production of pictures by printing or by projecting image information onto a photographic recording material.

BACKGROUND ART

Recording drum devices generally include a rotating clamping drum for the recording medium and a recording unit which is stationary relative to the rotation movement of the clamping drum, which unit consists of one or more recording heads which are displaceable parallel to the axis of one or more recording head fields which extend essentially parallel to the axis of rotation of the clamping drum. The recording of image information is carried out point by point, whereby the whole surface of the recording material mounted on the clamping drum is passed over on the one hand by rotation of the clamping drum and on the other hand by displacement parallel to the clamping drum axis of the recording heads or the recording head fields extending across the width of the clamping drum. Recording drum devices of this type are used, for example, for photographic recording processes by way of, for example, light diode exposure of photosensitive copier material or film, and for electrostatic printing processes, as well as for ink jet printing processes.

In the previously known recording drum devices of this type, the recording medium depending on the technology either paper or photographic copy material adapted to the intended use—is manually or automatically fed from the outside to the clamping drum and appropriately fixed on the mantle surface thereof. The recording medium must thereby always be cut first to the length corresponding to the drum circumference. If the length of the clamped-on recording material section does not correspond with the length of the image to be recorded or the total length of the images to be recorded, measured in circumferential direction of the clamping drum, cuttings and, thus, waste result.

SUMMARY OF THE INVENTION

This disadvantage is now to be overcome by the present invention and a drum recording arrangement of the generic type is to be further improved accordingly such that clippings-derived waste is avoided. Moreover, the automatic feeding of the recording medium into the clamping drum is to be simplified.

According to the principle idea of the invention, the recording medium is fed from the inside of the clamping drum onto its mantle and fastened thereon. This on the one hand results in an especially simple and advantageous construction and allows on the other hand the cutting of the recording medium to the respectively required exact length after the recording of the image information, without generating clippings. The image format can thereby be arbitrarily varied within the available length of the clamping drum circumference, which permits a very flexible and economical operation of the recording device. Of course, several pictures can also be recorded thereby in one step, as long as their total length does not exceed the circumference of the clamping drum. The physical separation of the recorded pictures into individual pictures can thereby take place even on the clamping drum itself (after completed recording) or in a separate operating step.

The recording arrangement in accordance with the invention is especially suited for use in photographic printers, as well as minilabs, and in high performance ink jet printers.

BRIEF DESCRIPTION OF THE DRAWINGS

The invention is further described in the following by way of the drawing. It shows.

DETAILED DESCRIPTION OF THE PREFERRED EMBODIMENT

Figure 1:
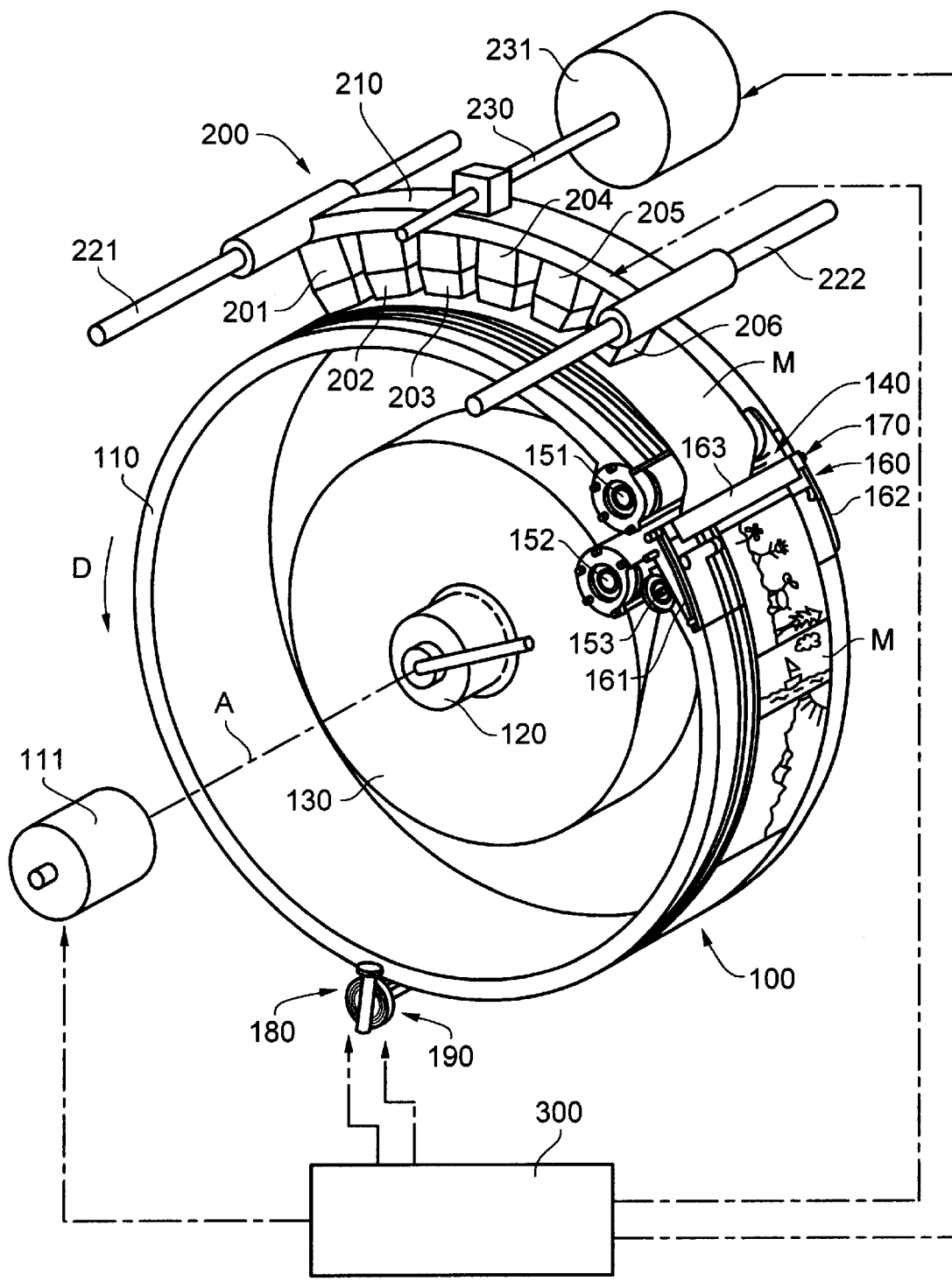
FIG. 1 is a complete schematic illustration of the parts relevant to the invention of a first embodiment of the recording drum device in accordance with the invention, FIGS. 2 to 5 each a detailed portion of the recording arrangement of FIG. 1 in four characteristic operational phases, FIGS. 6 to 7 each a schematic overview illustration of a second embodiment in two views rotated relative to each other by 180° and FIGS. 8 to 12 each a schematic sectional illustration of the recording arrangement of FIG. 6 in five characteristic functional phases.

As is apparent from the complete illustration in FIG. 1, the recording device includes a clamping drum identified in general by 100 and a recording unit identified in general by 200 as well as an electronic control 300, which controls all movement sequences and functions of the device.

The clamping drum 100 has a cylindrical mantle 110 and is driven by a drive motor 111 controlled by the control 300 for rotation about its axis A in direction of the arrow D.

The recording unit 200 positioned above the clamping drum 100 which is positioned in a not illustrated frame stationary relative to the rotation movement of the clamping drum includes in this embodiment six recording heads 201 to 206 positioned in direction of rotation one behind the other, which are mounted on a common carrier 210. The carrier 210 is displaceably supported on two slide rods 221 and 222 and is linearly movable by way of a spindle 230 driven by a spindle motor 231. In this matter, the recording heads 201 to 206 can be adjusted forward and backward together in the direction parallel to the axis of rotation A of the clamping drum 100 and controlled by the control 300.

The recording heads 201 to 206 can be differently constructed depending on the purpose of the device. They can be, for example, ink jet print heads or point-form light sources for photographic projection. Especially in the latter case, one or more linear arrays (fields) of recording heads can be provided instead of the transversely moveable recording heads, which extend parallel to the axis of rotation A of the clamping drum and cover the whole active width thereof. Such linear arrays of recording heads can typically be formed by rows of light diodes. Recording heads or arrays of recording heads for different recording technologies are known per se and, therefore, do not need to be further described for the person skilled in the art.

A coaxial clamping mandrel 120 is found in the interior of the clamping drum 100, onto which is mounted a storage roll 130 of recording medium M, for example, printing paper of suitable quality. A slit 140 is provided in the mantle 110 of the clamping drum 100 which connects the interior of the clamping drum 100 with its exterior. A redirecting roller 151 is recessed at the forward side of the slit 140 in the direction of rotation of the clamping drum so that it is flush with the surface of the mantle 110. A pair of clamping rollers 152 and 153 are located below the slit 140 and somewhat displaced against the direction of rotation. A clamping arrangement 160 is provided at the mantle at the rearward side of the slit 140 in direction of rotation of the clamping drum, which clamping arrangement is used for the tightening of the recording medium M on the mantle 110 of the clamping drum 100. The clamping arrangement 160 includes two carrier arms 161 and 162 pivotally mounted to both sides of the mantle 110 and a clamping bar 163 connecting them, which extends transverse across the width of the clamping drum 100 or its mantle 110. Further mounted to the two carrier arms 161 and 162 is a cutting arrangement in the form of a knife bar 170 extending across the mantle 110 which is moveable together with the clamping bar 163. The clamping bar 163 is normally pressed against the surface of the mantle 110 by not-illustrated springs and thereby clamps the recording medium M found thereunder onto the mantle 110 of the clamping drum 100.

An activating arrangement 180 is provided, for example, opposite the recording unit 200 and stationary in a not-illustrated frame, which operates the clamping arrangement 160 and the cutting arrangement 170 controlled by the control 300, when the clamping drum 100 is in a defined position of rotation in which the activating arrangement 180 is opposite the clamping arrangement 160 and can be brought into engagement therewith. At the same location, a drive arrangement 190 is provided also stationary in a not-illustrated frame. which in the mentioned position of rotation of the clamping drum 100 can be brought into engagement with the recording medium M on the mantle 110, under control of the control 300, and functions to advance the recording medium M, in a manner to be described, in the direction of rotation of the clamping drum 100 relative to the mantle 110 thereof. The drive arrangement 190 is only symbolically indicated in FIG. 1 and details are apparent from FIGS. 2 to 5.

Figure 2:
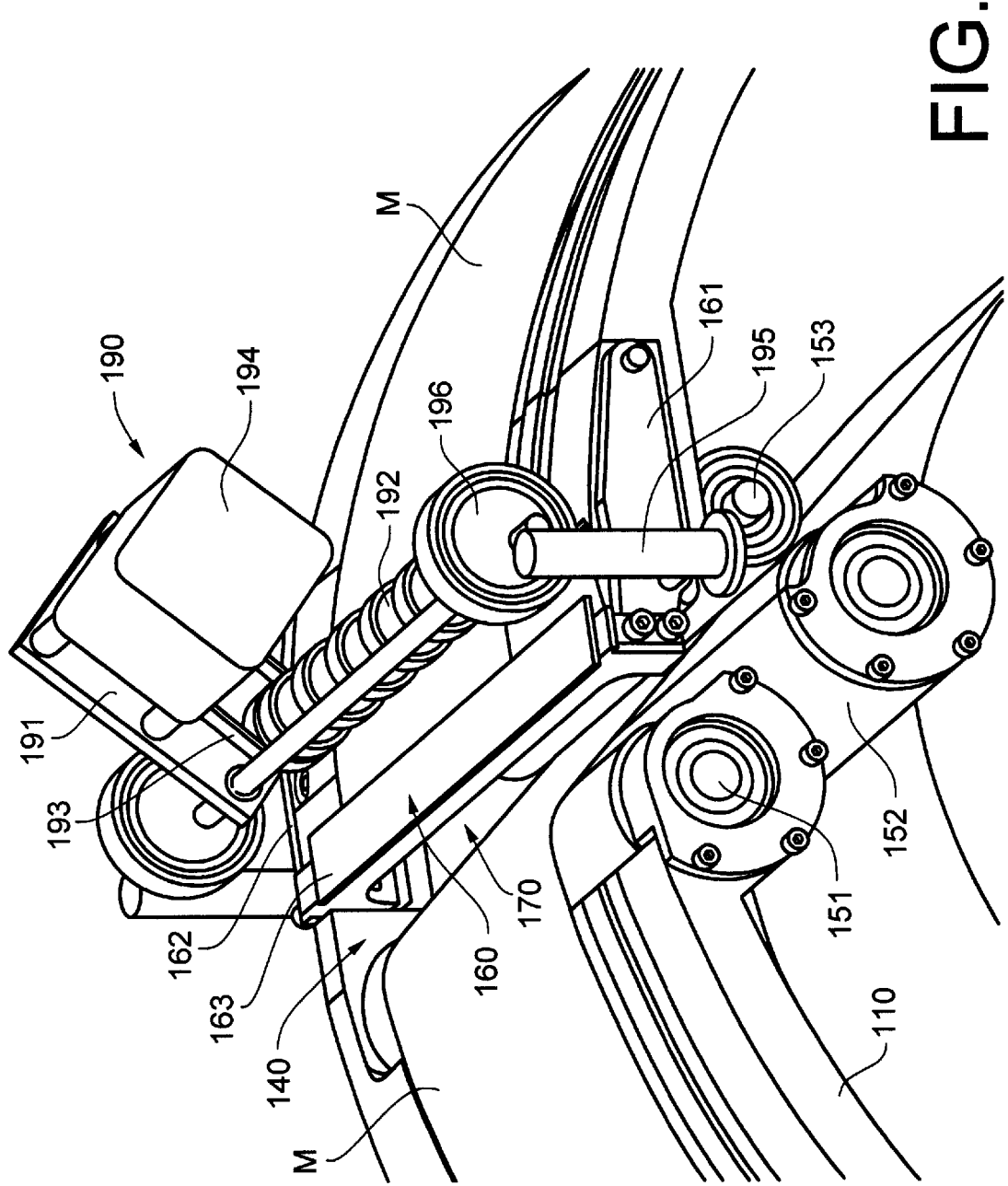

As is shown in the detailed illustration of FIG. 2, the drive arrangement 190 essentially includes a drive roller 192 rotatably supported in a pivotable frame 191, which roller is driven by means of a belt 193 by a motor 194 connected with the control 300. The pivotable frame 191 is mounted stationary in a not-illustrated frame and can be moved to and from the mantle 110 by an only symbolically indicated excenter mechanism 195–196, whereby the drive roller 192 comes into engagement with or is lifted off the recording medium M located on the mantle. The clamping arrangement 160 and the cutting arrangement 170 connected therewith are also actuated by the same excenter mechanism 195–196. The excenter mechanism 195–196 is driven by a not-illustrated stationary motor which in turn is connected with the control 300 and controlled thereby.

The recording device functions as follows:

After a storage roller 130 of recording medium M is mounted on the clamping mandrel 120 in the interior of the clamping drum 100, the start of the band-shaped recording medium M is guided between the clamping roller pair 152–153 and through the slit 140 to the exterior and about the mantle 110 of the clamping drum 100, and fastened by way of the clamping arrangement 160. The drive arrangement 190 is in its inactivated position wherein the draft roller 192 is lifted off the mantle 110. The recording medium M is thereby fastened onto the clamping drum 100 and the device is ready for the recording process (FIG. 2).

The clamping drum 100 is now rotated together with the recording medium M in the direction of rotation of the arrow D and the image information to be recorded is recorded by way of the recording unit 200 on the portion of the recording medium M located on the mantle 110 or a part thereof and in a manner known per se. When the recording process is completed, the clamping drum 100 is stopped in the aforementioned defined position of rotation (parked position).

Figure 3:
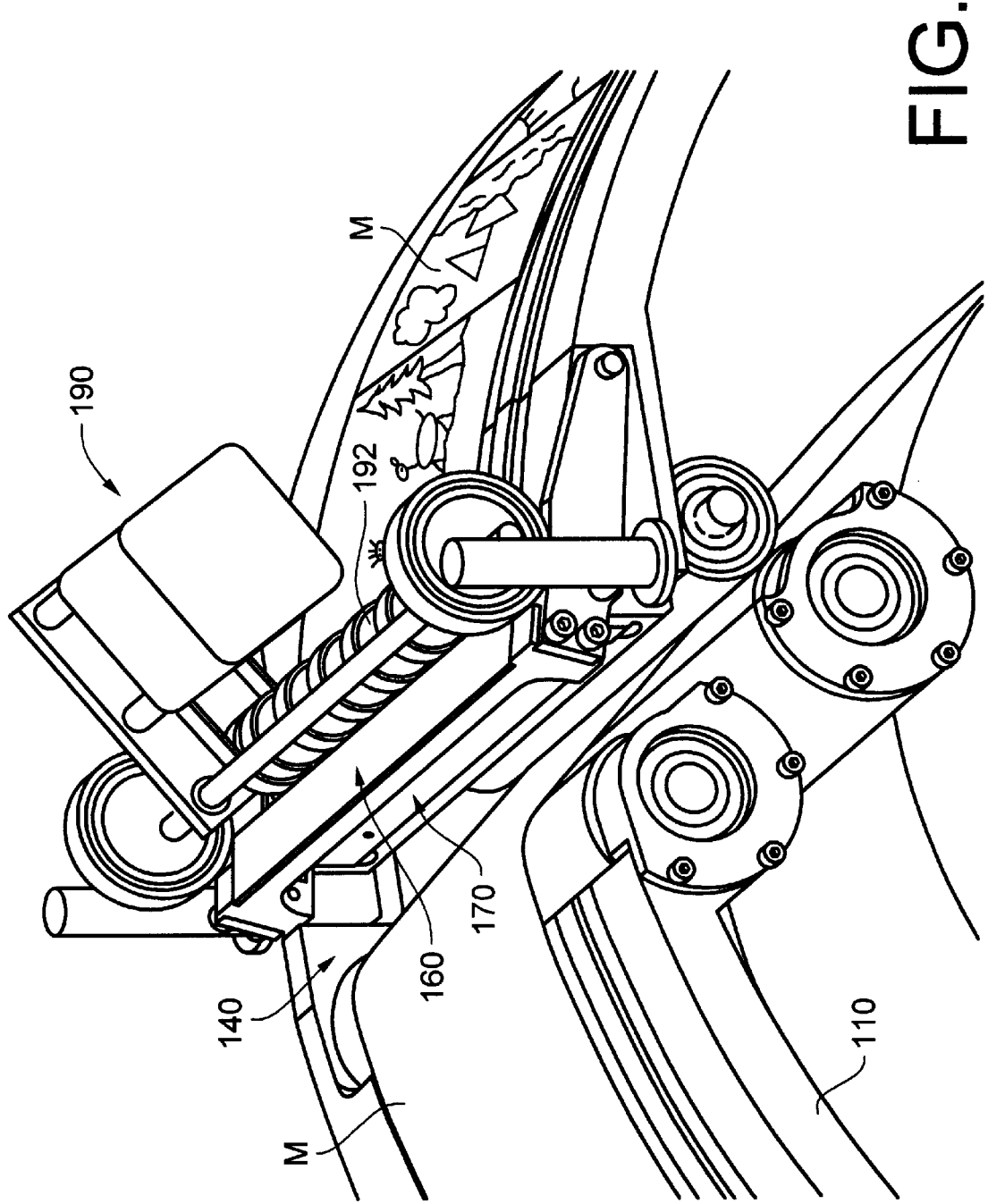

The drive arrangement 190, as illustrated in FIG. 3, is now lowered onto the mantle 110 so that the drive roller 192 comes into engagement with the recording medium M on the mantle. At the same time, or immediately thereafter, the clamping arrangement 160 is lifted off the mantle 110, together with the knife bar 170, so that the recording medium M is at this location only held on the mantle 110 by the drive roller 192.

Figure 4:
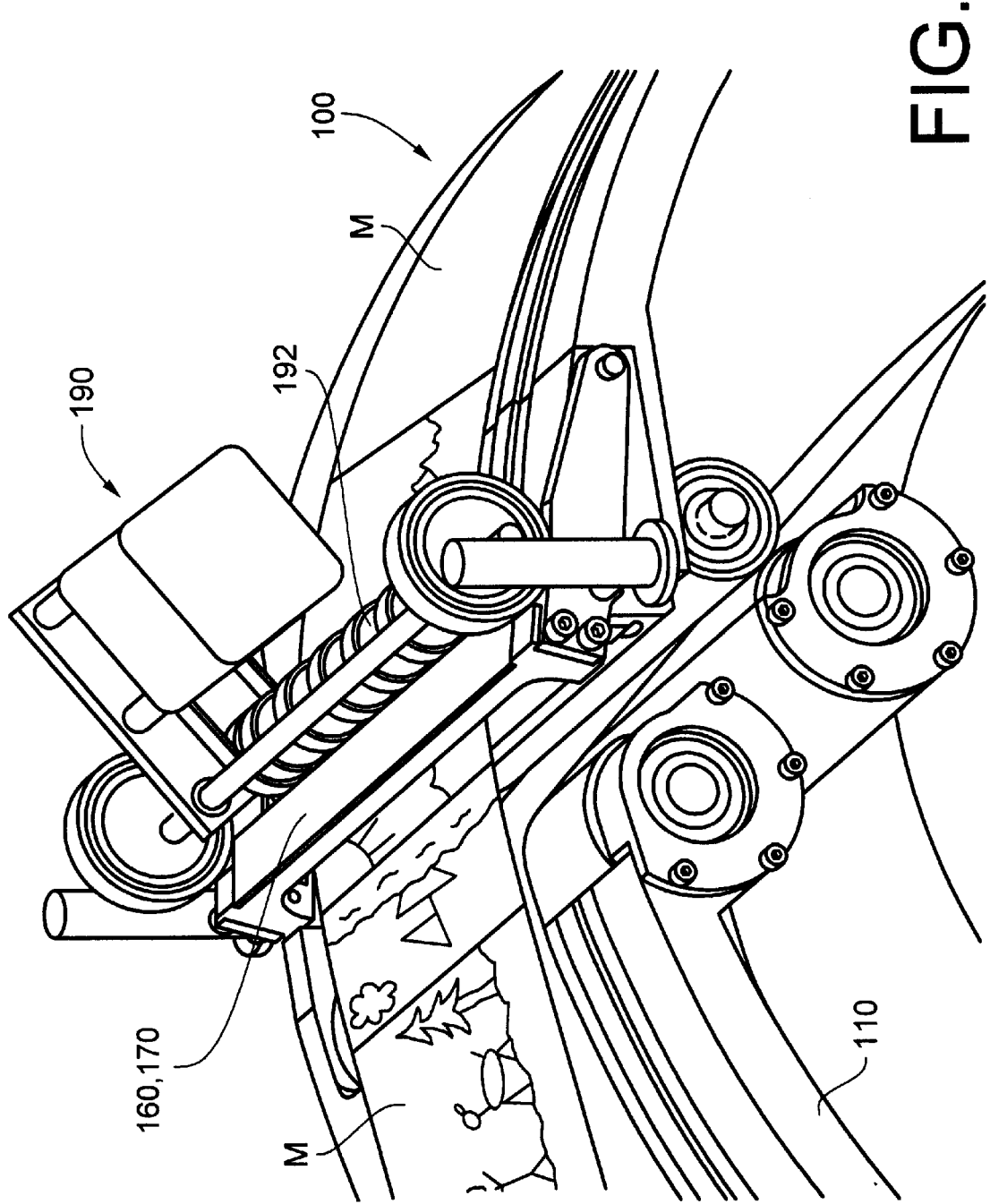

The written-on (image-carrying) section of the recording medium M is now ejected (FIG. 4). The drive roller 192 is therefor rotated and the recording medium band M advanced in direction of rotation of the clamping drum 100 under the knife bar 170 until the rearward end of the described section is located under the knife bar 170.

Figure 5:
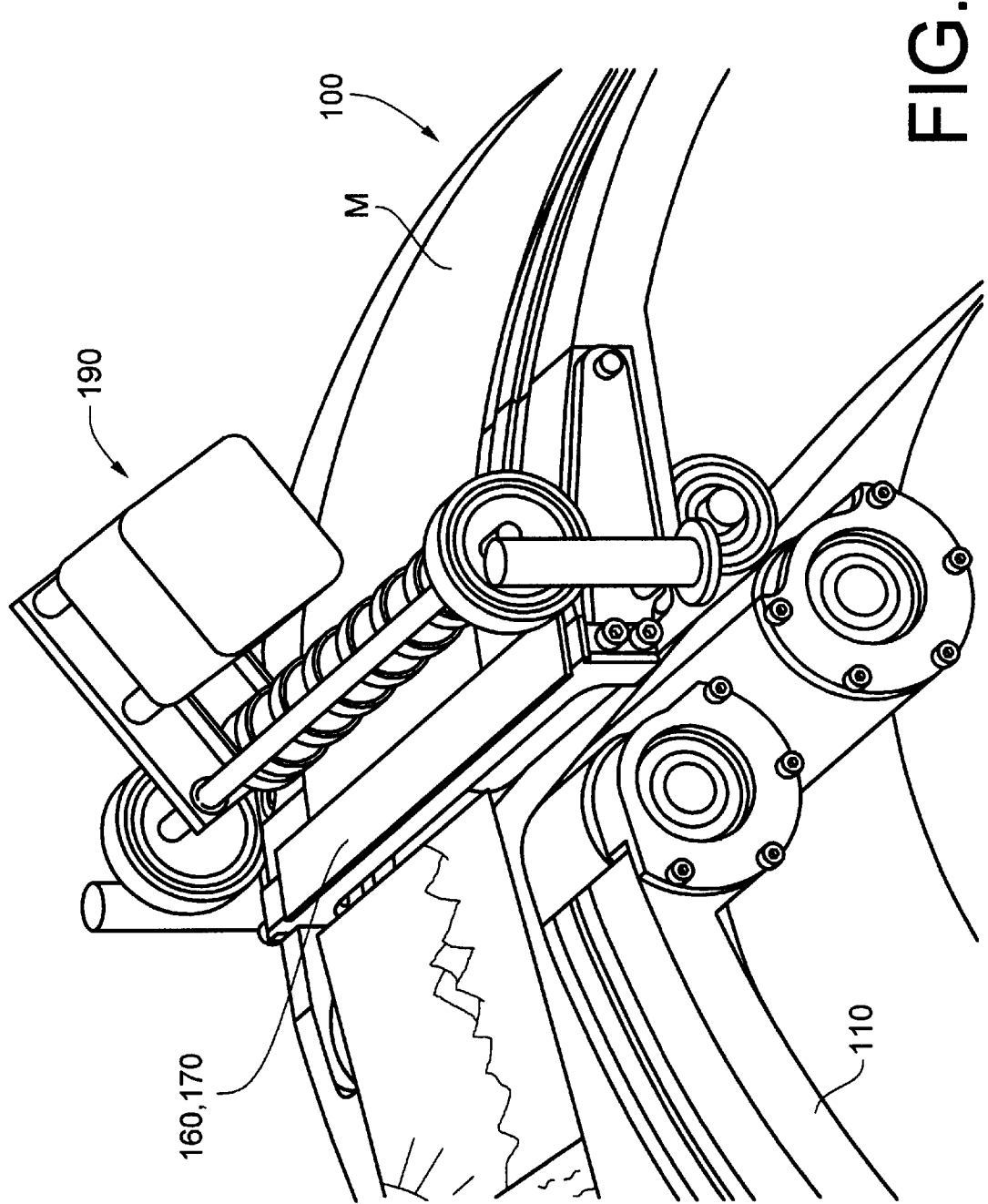
Figure 6:
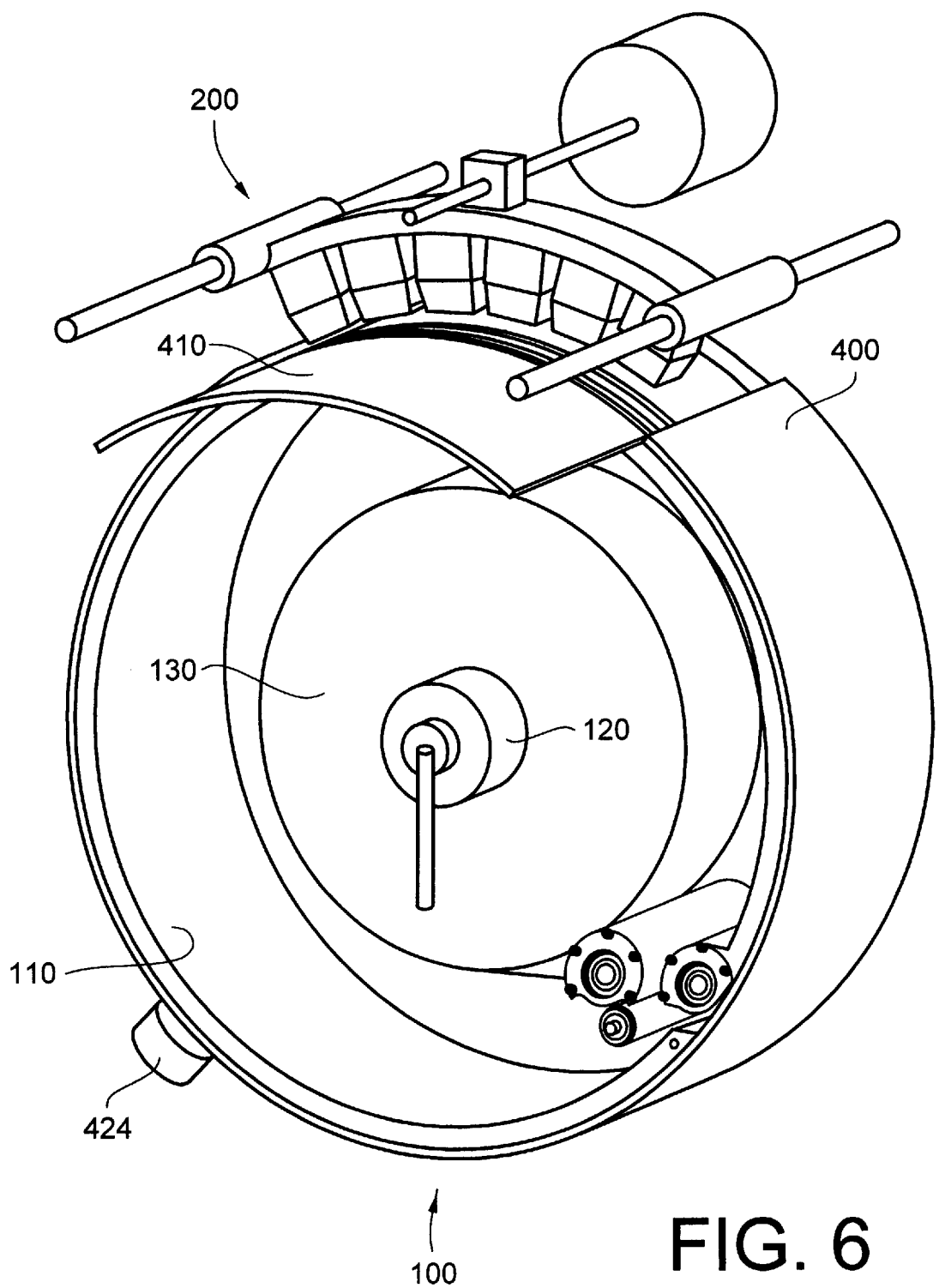

The clamping arrangement 160 is thereafter once again pressed against the mantle 160 together with the knife bar 170 connected therewith and the drive arrangement 190 is simultaneously or immediately thereafter lifted off the mantle 110. By the downward movement (radially inwardly relative to the drum) of the clamping arrangement 160 and the knife bar 170, the written-on section of the medium is cut off and the new beginning of the still not printed-on medium is clamped on the clamping drum. The arrangement is now ready for the next recording process (FIG. 5).

FIGS. 6 to 12 show a second embodiment of the recording device wherein the clamping drum rotates with constant speed during the whole recording period. This has the advantage that the down times otherwise resulting from the deceleration and acceleration of the clamping drum are obviated. The clamping drum need only be stopped for the initial loading and for the reloading of recording medium.

The recording device of FIGS. 6 to 12 corresponds in its principle construction to the one of FIGS. 1 to 5. Identical or corresponding parts are therefore provided with the same reference numeral. The essential difference resides in the replacement of the clamping arrangement 160 in this embodiment with a suction arrangement 460 so that the cutting arrangement 170 positioned on the clamping drum, as well as the stationary activating arrangement 180 and the stationary drive arrangement 190 are obviated. A further essential difference consists in a stationary cylindrical guide mantle 400 which coaxially surrounds the clamping drum 100 or its mantle 110, and in this manner forms a guide channel for the recording medium M between itself and the mantle 110. The suction arrangement 460 is of conventional construction and is connected to a not-illustrated vacuum source which is operably connected with the control 300 and activated or deactivated thereby and can be reversed in its effect thereby. When the vacuum source is activated, the end of the recording medium M above the suction arrangement 460 is fastened on the mantle 110 of the clamping drum 100 because of the suction effect and, upon deactivation of the vacuum source, the recording medium is released. Upon reversed suction, the end of the recording medium M is actively lifted off the mantle 110 because of the blowing effect.

The guide mantle 400 is provided with a movable window 410 in the region of the recording unit 200, which window is movable back and forth by way of a not-illustrated drive parallel to the axis of rotation of the clamping drum 100 between an open position and a closed position. In the open position (FIGS. 6 and 8) the recording medium M located below the recording heads of the recording unit 200 is accessible and in the closed position the movable window 410, just like the rest of the guide mantle 400, forms a guide surface for the recording medium M.

Figure 7:
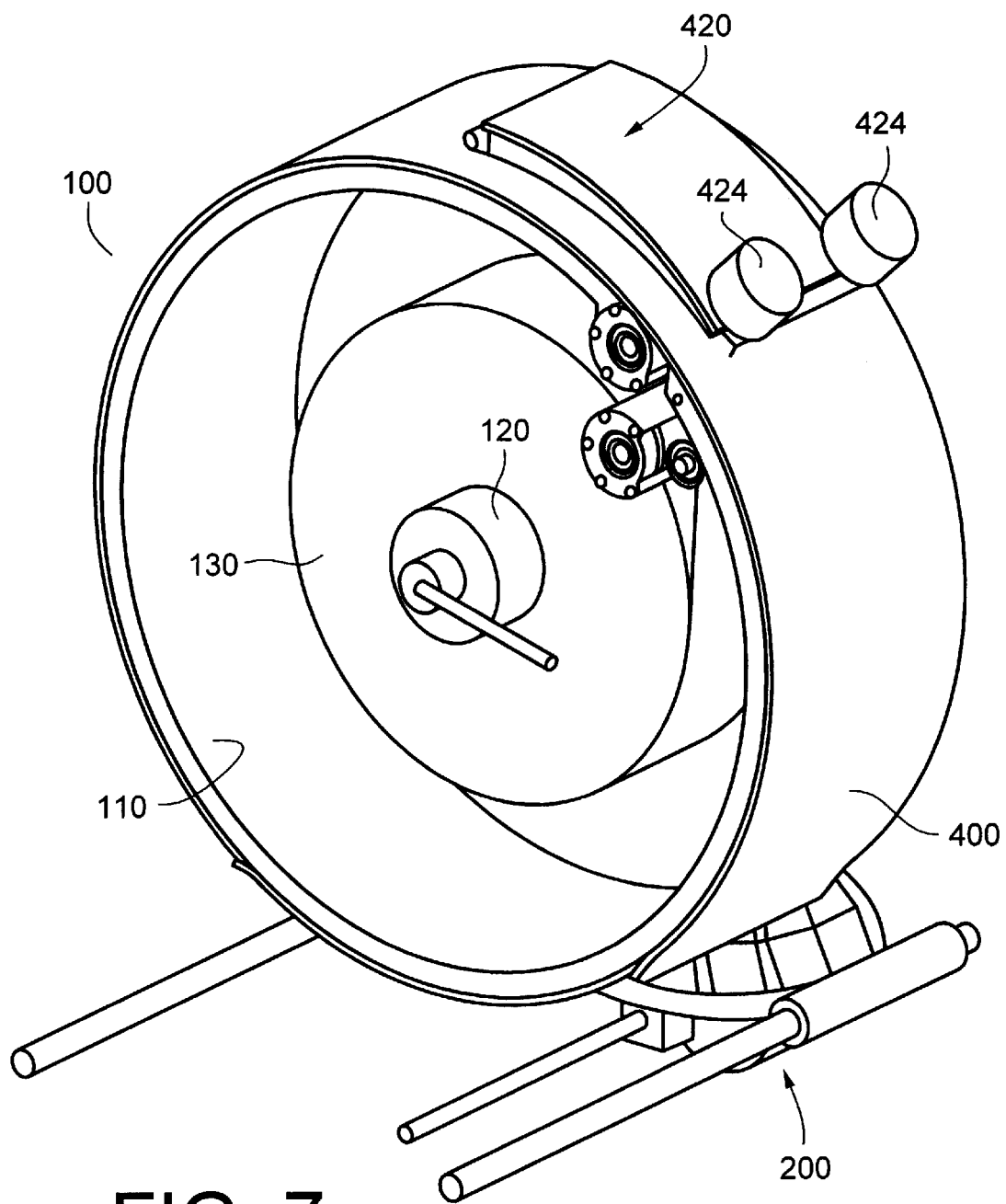

About diagonally opposite the movable window 410, a switch 420 is inset into the guide mantle 400 (FIG. 7). This switch consists essentially of two coaxial guide surfaces 421 and 422 which have an essentially cylindrical curvature and which form a switch channel 423 therebetween. The two guide surfaces 421 and 422 and therefore the whole switch 420 are pivotally supported at their rear ends for pivoting about a stationary axis W parallel to the axis of rotation of the clamping drum, so that their forward ends can be pivoted regularly inward or outward. A switch drive is provided for this pivoting movement of the switch 420 which drive is symbolically indicated by two elements 424 and cooperates with the control 300. At a rear end of the switch 420, the switch channel 423 opens into a stationary removal channel 430 adjacent the switch 420 (FIGS. 8 to 12).

Figure 10:
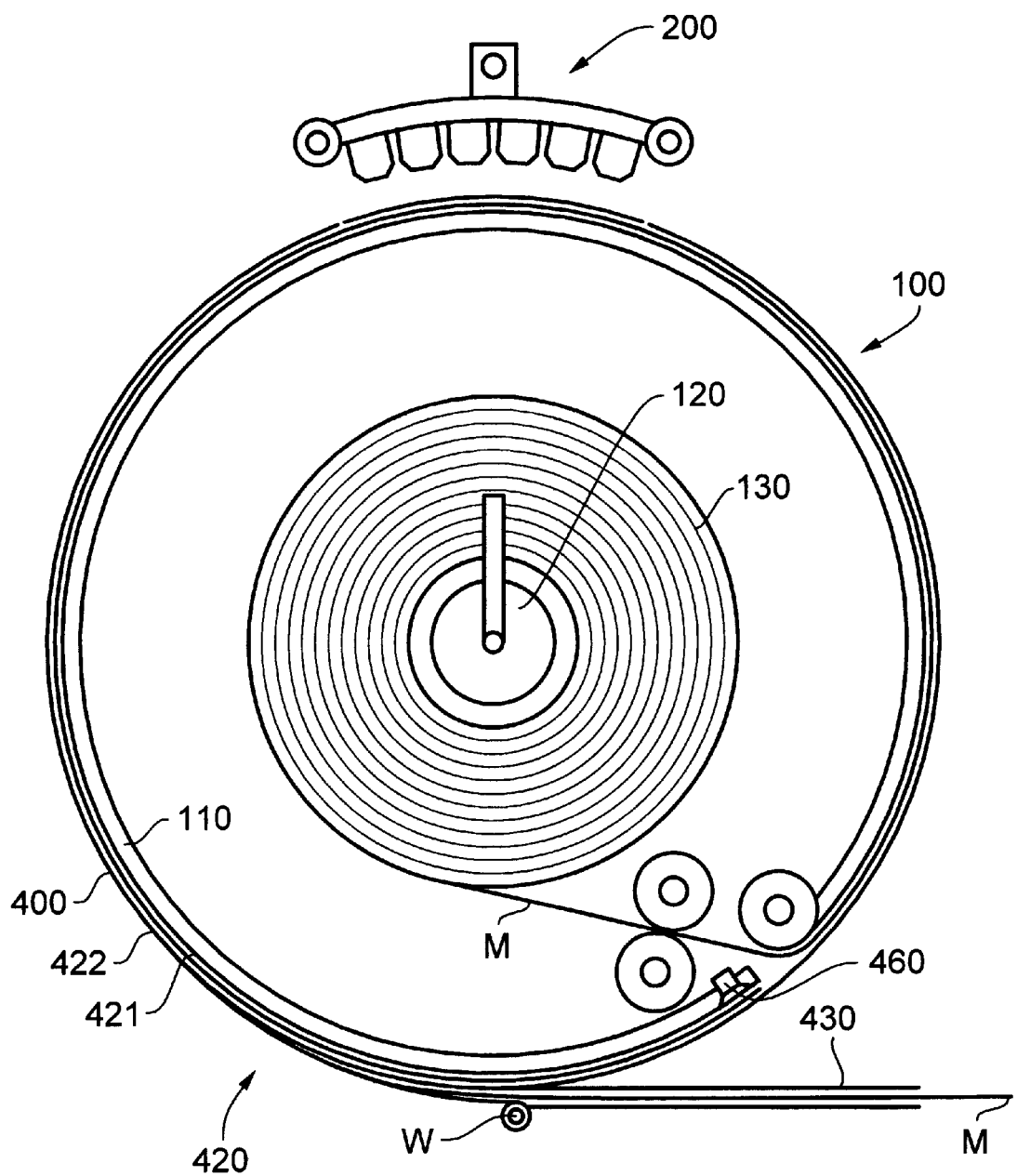

In the radially outer normal position of the switch 420, its inner guide surface 421 is aligned with the guide mantle 400 (FIG. 8), in the radially outer unloading position, the inner guide surface 421 practically lies on the mantle 110 of the clamping drum 100 and the outer guide surface 422 is aligned at its free forward end essentially with the guide mantle 400 (FIG. 10).

Figure 8:
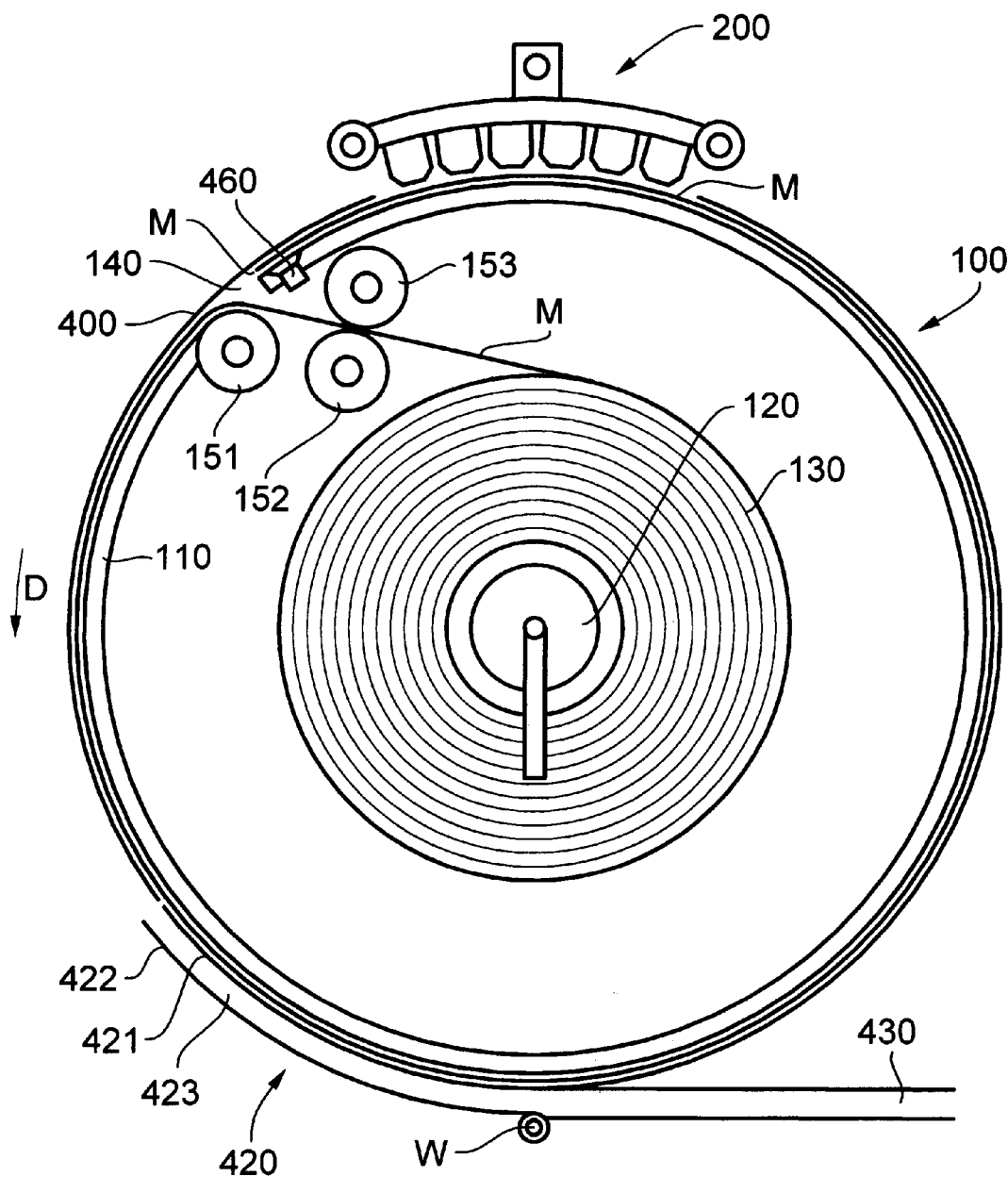
Figure 11:
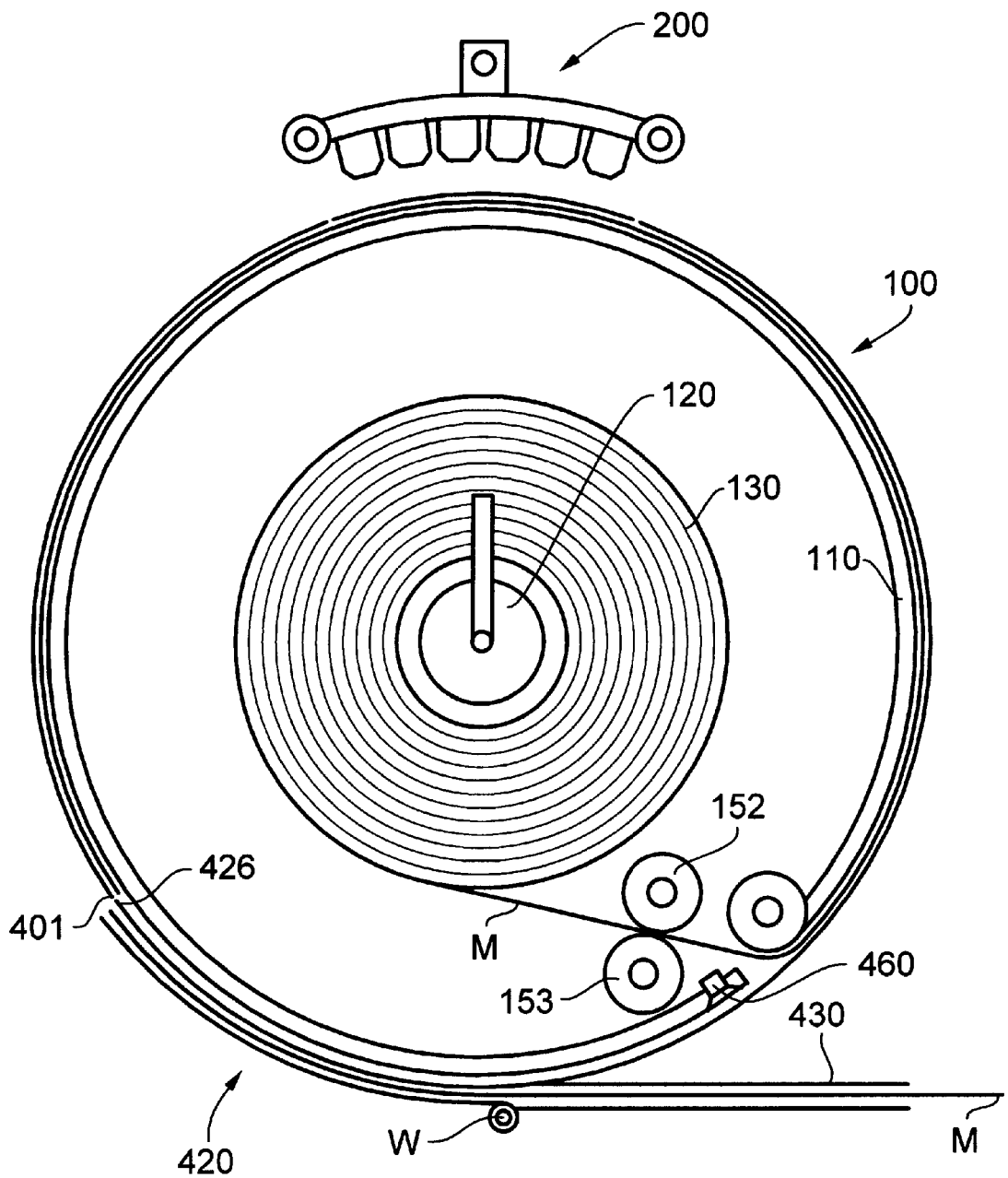
Figure 12:
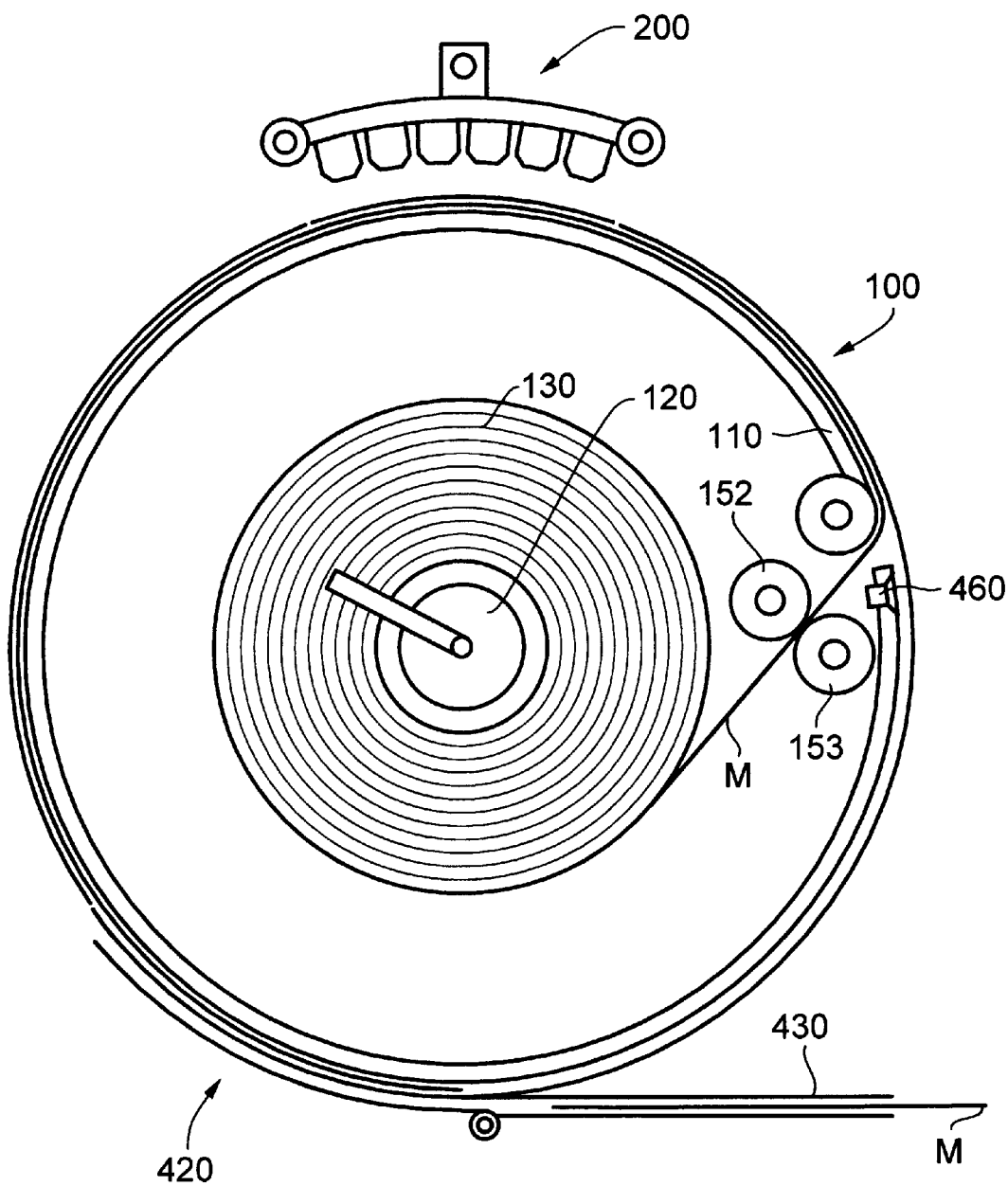

The free, forward end 426 of the inner guide surface 421 of the switch 420 is further formed as a cutting knife in a manner known per se which cooperates with the oppositely located edge 401 of the guide mantle 400 and together therewith forms a cutting arrangement for the recording medium M (FIG. 11). The functioning of this variant of the recording arrangement is as follows:

After a storage roll 130 of recording medium M is mounted on the clamping mandrel 120 in the interior of the clamping drum 100, the beginning of the band-shaped recording medium M is clamped between the clamping roller pair 152–153, guided through the slit 140 to the exterior, guided around the mantle 110 of the clamping drum 100 and fastened by way of the vacuum arrangement 460. Simultaneously or subsequently, the moveable window 410 is moved into the open position (FIG. 6) and the switch 420 is pivoted into its normal position (FIG. 8). The recording medium M is thereby fastened on the clamping drum 100 and the device is ready for the recording process.

The clamping drum 100 is now rotated together with the recording medium M in direction of the arrow D and the image information to be recorded is recorded by way of the recording unit 200 on the section of the recording medium M found on the mantle 110 or on a part thereof in a manner known per se (FIG. 8).

Figure 9:
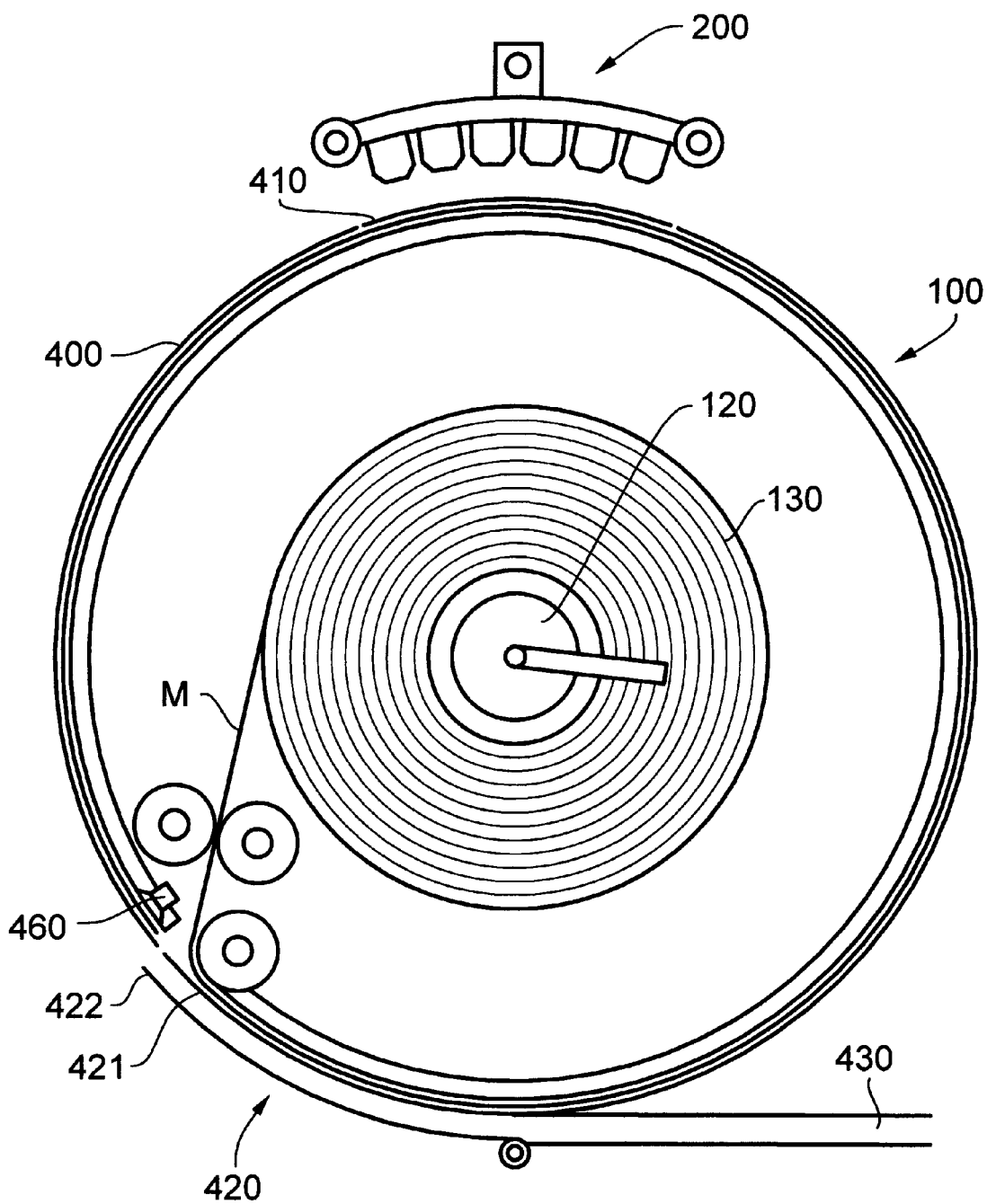

When the recording process is finished, the recording unit 200 is axially displaced into a parking position and the movable window 410 is again closed (FIG. 9). The clamping roller 100 continues to rotate with constant speed.

When the clamping drum 100 arrives at a position of rotation in which the suction arrangement 460 is located just before the switch 420 (FIG. 9), the switch 420 is pivoted into its inner discharge position and the vacuum arrangement 460 is deactivated or reversed in its effect. The remaining portion of the recording medium M is thereby lifted off the mantle 110 of the clamping drum 100 and guided into the switch channel 423. The switch 420 then during a further rotation of the clamping drum 100 guides the recording medium M into the discharge channel 430. The recording medium M is therefore, figuratively speaking, in a way "peeled off" the clamping drum 100 (FIG. 10).

After the image-carrying part of the recording medium M has been detached from the clamping drum 100, the switch 420 is swiveled back into its outer, normal position. The forward, free end of the inner guide surface 421 of the switch 420 which is formed as a cutting arrangement thereby severs the image-carrying portion from the remaining recording medium still found on the clamping drum (FIG. 11). The image-carrying portion is guided through the removal channel 430 to an external not-illustrated arrangement for the further processing, for example, separation into individual pictures.

Recording medium M is now pulled from the storage roller 130 by way of the clamping rollers 152 and 153 driven by a not-illustrated drive motor (FIG. 12) and further advanced until the forward end reaches the engagement area of the suction arrangement 460. The latter is subsequently again activated and the recording medium M so fixed on the clamping drum. The arrangement is now again ready for the next recording step (FIG. 8).

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. Apparatus for recording image information onto a planar recording medium, comprising:
    a rotatably driven clamping drum having a mantle;
    means for listening the recording medium on the mantle;
    a recording unit stationary relative to the direction of rotation of the clamping drum for recording image information on the fastened recording medium, said image information being fed thereto in the form of electrical signals;
    mounting means provided in an interior of the clamping drum for supporting a supply of recording medium wound up into a roll, the clamping drum having a slit in said mantle for permitting passage of the recording medium from the interior of the clamping drum onto the mantle; and
    a drive arrangement stationary relative to the direction of rotation of the clamping drum and engageable with the fastened recording medium in a defined rotational position of the clamping drum for advancing the recording medium on the mantle in the direction of rotation of the clamping drum; said drive arrangement being movable to the mantle by a mechanism such that the drive arrangement comes into engagement with the recording medium and being moveable from the mantle by the mechanism such that the drive mechanism is lifted off the recording medium.

2. Apparatus according to claim 1, wherein the fastening means include a releasable clamping arrangement positioned in the direction of rotation of the clamping drum adjacent said slit, said clamping arrangement being also actuated by said mechanism.

3. Apparatus according to claim 1, further comprising a cutting arrangement for selectively cutting off the recording medium, the cutting arrangement being provided on the clamping drum proximal said slit, said cutting arrangement being also actuated by said mechanism.

4. Apparatus according to claim 3, further comprising an activating arrangement stationary relative to the direction of rotation of the clamping drum and engageable with the cutting arrangement in a defined rotational position of the clamping drum for operating the cutting arrangement.

5. Apparatus according to claim 1, further comprising a stationary guide mantle coaxially surrounding the clamping drum, the guide mantle being provided with a switch reciprocal between a normal position and a discharge position for directing an image-carrying portion of the recording medium away from the clamping drum when the switch is in the discharge position.

6. Apparatus according to claim 5, wherein a free end of the switch is provided with a cutting arrangement.

7. Apparatus according to claim 5, wherein the guide mantle in the region of the recording unit is provided with a selectively closeable window.

8. Apparatus according to claim 1, wherein the fastening means include a vacuum arrangement positioned in direction of rotation of the clamping drum adjacent said slit.

9. Apparatus according to claim 8, wherein the vacuum arrangement is reversible.

10. Apparatus For recording image information onto a planar recording medium, comprising:

a rotatably driven clamping drum having a mantle;

means for fastening the recording medium on the mantle;

a recording unit stationary relative to the direction of rotation of the clamping drum for recording image information on the fastened recording medium said image information being fed thereto in the form of electrical signals;

mounting means provided in an interior of the clamping drum for supporting a supply of recording medium wound up into a roll, the clamping drum having a slit in said mantle for permitting passage of the recording medium from the interior of the clamping drum onto the mantle; and a stationary guide mantle coaxially surrounding the clamping drum, the guide mantle being provided with a switch reciprocal between a normal position and a discharge position for directing an image-carrying portion of the recording medium away from the clamping drum when the switch is in the discharge position.

11. Apparatus according to claim 10, wherein a free end of the switch is provided with a cutting arrangement.

12. Apparatus according to claim 10, wherein the guide mantle in the region of the recording unit is provided with a selectively closeable window.

13. Apparatus for recording image information onto a planar recording medium, comprising:

a rotatably driven clamping drum having a mantle;

means for fastening the recording medium on the mantle;

a recording unit stationary relative to the direction of rotation of the clamping drum for recording image information on the fastened recording medium said image information being fed thereto in the form of electrical signals; and mounting means provided in an interior of the clamping drum for supporting a supply of recording medium wound up into a roll, the clamping drum having a slit in said mantle for permitting passage of the recording medium from the interior of the clamping drum onto the mantle; and means for guiding an image-carrying portion of the recording medium away from the rotating clamping drum, wherein the fastening means include a vacuum arrangement positioned in direction of rotation of the clamping drum adjacent said slit.

14. Apparatus according to claim 13, wherein the vacuum arrangement is reversible.

* * * * *